US008732240B1

(12) United States Patent
Tomkins et al.

(10) Patent No.: US 8,732,240 B1
(45) Date of Patent: *May 20, 2014

(54) SCORING STREAM ITEMS WITH MODELS BASED ON USER INTERESTS

(75) Inventors: Andrew Tomkins, San Jose, CA (US);
Dandapani Sivakumar, Cupertino, CA (US); Sangsoo Sung, Palo Alto, CA (US); Justin Kosslyn, Mountain View, CA (US); Todd Jackson, San Francisco, CA (US); Andre Rohe, Mountain View, CA (US); Ya Luo, Milpitas, CA (US); Andrew Bunner, Belmont, CA (US); Sasha Sobol, Mountain View, CA (US); Luca de Alfaro, Mountain View, CA (US)

(73) Assignee: Google Inc., Mountain View, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 13/098,132

(22) Filed: Apr. 29, 2011

Related U.S. Application Data

(60) Provisional application No. 61/424,636, filed on Dec. 18, 2010.

(51) Int. Cl.
*G06F 15/16* (2006.01)
*G06F 15/173* (2006.01)

(52) U.S. Cl.
USPC .......................................... 709/204; 709/224

(58) Field of Classification Search
USPC ......................................................... 709/204
See application file for complete search history.

(56) References Cited

U.S. PATENT DOCUMENTS

| 6,130,938 | A | 10/2000 | Erb |
| 6,192,119 | B1 | 2/2001 | Wilson |
| 6,697,478 | B1 | 2/2004 | Meldrum et al. |
| 6,754,322 | B1 | 6/2004 | Bushnell |
| 7,003,515 | B1 | 2/2006 | Glaser et al. |
| 7,106,848 | B1 | 9/2006 | Barlow et al. |
| 7,366,990 | B2 | 4/2008 | Pitroda |
| 7,401,025 | B1 | 7/2008 | Lokitz |
| 7,555,110 | B2 | 6/2009 | Dolan et al. |
| 7,610,287 | B1 | 10/2009 | Dean et al. |
| 7,742,468 | B2 | 6/2010 | Vagelos |

(Continued)

FOREIGN PATENT DOCUMENTS

WO    WO0279984    10/2002

OTHER PUBLICATIONS

Adamic et al., Search in power-law networks, 2001, HP Labs/Stanford University, The American Physical Society.*

(Continued)

*Primary Examiner* — Hassan Phillips
*Assistant Examiner* — Omeed D Rahgozar
(74) *Attorney, Agent, or Firm* — Patent Law Works LLP

(57) ABSTRACT

A system and method for generating a stream of content includes a content stream module that generates a model based on user input and/or prior activities using heterogeneous data sources. The heterogeneous data sources include search, entertainment, social activity and activity on third-party sites. The content stream module retrieves candidate content items that have interests that are similar to the user. The candidate content items are compared to the model and scored based upon interestingness of the content item to the user. The content stream module generates the stream of content from the candidate content items.

44 Claims, 13 Drawing Sheets

(56) References Cited

U.S. PATENT DOCUMENTS

| | | | |
|---|---|---|---|
| 7,761,454 B2 | 7/2010 | Smyth et al. | |
| 7,827,110 B1 | 11/2010 | Wieder | |
| 7,962,482 B2* | 6/2011 | Handman et al. | 707/733 |
| 8,055,655 B1* | 11/2011 | He et al. | 707/727 |
| 8,091,032 B2* | 1/2012 | Fischer | 715/751 |
| 2001/0042060 A1 | 11/2001 | Rouse et al. | |
| 2002/0137490 A1 | 9/2002 | Gallant | |
| 2002/0143874 A1 | 10/2002 | Marquette et al. | |
| 2002/0194076 A1 | 12/2002 | Williams et al. | |
| 2003/0061211 A1 | 3/2003 | Shultz et al. | |
| 2004/0258220 A1 | 12/2004 | Levine et al. | |
| 2004/0267740 A1 | 12/2004 | Liu et al. | |
| 2005/0152521 A1 | 7/2005 | Liljestrand | |
| 2006/0020616 A1 | 1/2006 | Hardy et al. | |
| 2006/0026288 A1 | 2/2006 | Acharya et al. | |
| 2006/0041530 A1 | 2/2006 | Milic-Frayling et al. | |
| 2006/0074883 A1 | 4/2006 | Teevan et al. | |
| 2006/0077957 A1 | 4/2006 | Reddy et al. | |
| 2006/0136589 A1 | 6/2006 | Konig et al. | |
| 2006/0167857 A1 | 7/2006 | Kraft et al. | |
| 2006/0206604 A1 | 9/2006 | O'Neil et al. | |
| 2006/0212444 A1* | 9/2006 | Handman et al. | 707/5 |
| 2006/0242139 A1* | 10/2006 | Butterfield et al. | 707/5 |
| 2006/0282336 A1 | 12/2006 | Huang | |
| 2007/0016553 A1 | 1/2007 | Dumais et al. | |
| 2007/0043742 A1 | 2/2007 | Arguello et al. | |
| 2007/0060099 A1 | 3/2007 | Ramer et al. | |
| 2007/0109616 A1 | 5/2007 | Thompson | |
| 2007/0127631 A1 | 6/2007 | Difiglia | |
| 2007/0143260 A1 | 6/2007 | Markov et al. | |
| 2007/0171898 A1 | 7/2007 | Salva | |
| 2007/0173236 A1 | 7/2007 | Vishwanathan et al. | |
| 2007/0219754 A1 | 9/2007 | D'Ambrosio | |
| 2007/0244884 A1 | 10/2007 | Yang | |
| 2007/0248077 A1 | 10/2007 | Mahle, Jr. et al. | |
| 2007/0265905 A1 | 11/2007 | Lazier | |
| 2008/0004989 A1 | 1/2008 | Yi | |
| 2008/0040474 A1* | 2/2008 | Zuckerberg et al. | 709/224 |
| 2008/0056475 A1 | 3/2008 | Brannick et al. | |
| 2008/0059460 A1 | 3/2008 | Lunenfeld | |
| 2008/0077462 A1 | 3/2008 | Patel et al. | |
| 2008/0147450 A1* | 6/2008 | Mortimore | 705/5 |
| 2008/0192656 A1 | 8/2008 | Vagelos | |
| 2008/0208841 A1 | 8/2008 | Zeng et al. | |
| 2008/0209320 A1 | 8/2008 | Mawhinney et al. | |
| 2008/0255977 A1 | 10/2008 | Altberg et al. | |
| 2009/0113288 A1 | 4/2009 | Thampy et al. | |
| 2009/0210321 A1 | 8/2009 | Rapp | |
| 2009/0222481 A1* | 9/2009 | Fisher et al. | 707/104.1 |
| 2010/0030717 A1 | 2/2010 | Agarwal et al. | |
| 2010/0042928 A1 | 2/2010 | Rinearson | |
| 2010/0131527 A1 | 5/2010 | Wohlert | |
| 2010/0287368 A1 | 11/2010 | Shuster et al. | |
| 2010/0299360 A1 | 11/2010 | Yi | |
| 2011/0041076 A1* | 2/2011 | Sinn et al. | 715/745 |
| 2011/0098156 A1 | 4/2011 | Ng et al. | |
| 2011/0154183 A1 | 6/2011 | Burns et al. | |
| 2011/0161336 A1 | 6/2011 | Shiga et al. | |
| 2011/0167054 A1 | 7/2011 | Bailey et al. | |
| 2011/0178995 A1 | 7/2011 | Suchter et al. | |
| 2011/0196933 A1 | 8/2011 | Jackson et al. | |
| 2011/0225170 A1 | 9/2011 | Obasanjo et al. | |
| 2011/0246907 A1* | 10/2011 | Wang et al. | 715/751 |
| 2012/0084291 A1* | 4/2012 | Chung et al. | 707/741 |
| 2012/0102410 A1 | 4/2012 | Gewecke et al. | |
| 2012/0144328 A1* | 6/2012 | O'byrne | 715/764 |
| 2012/0158753 A1* | 6/2012 | He et al. | 707/752 |
| 2013/0204873 A1 | 8/2013 | Vandermolen et al. | |
| 2013/0247212 A1 | 9/2013 | Muriello et al. | |

OTHER PUBLICATIONS

Adamic et al., "A Social Network Caught in the Web," Internet Journal, First Monday, Jun. 2, 2003, pp. 1-22, vol. 8, No. 6.

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, pp. 252-255, London, United Kingdom.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, May 13, 2011, 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 8, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, pp. 1-83.

(56) References Cited

OTHER PUBLICATIONS

Steen et al., "Development of we-centric, context-aware, adaptive mobile services requires empathy and dialogue," Freeband FRUX, Oct. 17, 2005, Internet Journal, Netherlands, pp. 1-4.
Superfeedr Track, Internet, retrieved at http://blog.superfeedr.com/track/filter/xmpp/pubsubhubbub/track, May 13, 2011, 8 pgs.
Twitter Blog: Tracking Twigger, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," Cefrio Book Chapter v 5.2, Jan. 18, 2005, pp. 1-15.

\* cited by examiner

Figure 4B

Search  Mail  Google.oo  Video  Books  more

[Search box]  Search

Melissa Garcia
View profile

Share your thoughts

Find more people >>

Stream

News
Videos
My Groups
Friends — 552
Family
Business
More [V]

People

Starred ☆

Notifications

Games

Questions

Photos

Welcome to your stream, Melissa! [X]   553
Add your interests to build your perfect stream

Cockatiel Training   [Expand explanation]
Suggested because you listed birds as an interest.

Is your cockatiel mean, unruly, or simply hard to train? If so, you have come to the right place – Bird Tricks. Cockatiels, like most birds, can be trained to behave and be a joy to yourself and...
BirdWebsite.com Expanded Explanation 554
    555
Animals [X]
  Birds [X]
    Parrots [X]   557
      African Greys [ ]
      Amazons [ ]
      Cockatiels [X]
      Parakeets [ ]

Jon Wickan and 4 other likes this

Jon Wickan – I know! I am a fan as well. :-) 1 week ago

Jaclyn Fercana – Bring it back! 1 week ago

Comment  Like  Hide      20 minutes ago   [Only me]
                                                    └ 512
550

SCORING STREAM ITEMS WITH MODELS BASED ON USER INTERESTS

CROSS REFERENCE TO RELATED APPLICATIONS

This application claims priority under 35 USC §119(e) to U.S. Application No. 61/424,636, entitled "Scoring Stream Items with Models Based on User Interests" filed Dec. 18, 2010, the entirety of which is herein incorporated by reference.

BACKGROUND

The specification relates to a system and method for generating a stream of content. In particular, the specification relates to generating a stream of content from heterogeneous data sources based on a model of user interests and distributing the stream of content within a social network.

Many consumers of digital media have two somewhat contradictory goals: keep apprised of information in the areas they already find interesting and discover new content that is also enjoyable. Keeping apprised of information can become burdensome in the digital age because there is so much information. In addition, news articles are often repetitive. As a result, the consumer needs a way to avoid becoming overwhelmed by the information and instead only needs to view the best and most relevant items for each topic and source. Similarly, discovering new content is difficult when the consumer is overburdened with existing content.

Attempts to solve these problems often rely on models that the user cannot see or understand, which leads to the user being confused about how and why each item of content was selected for viewing. If the user dislikes the content, there is no way to correct the model to provide more accurate content.

Feed readers for Really Simple Syndication (RSS) feeds display lists of blogs after the user manually subscribes to them. If a user clicks "home" on the user interface, the feed reader displays a shortened version of the list in a particular order based on the perceived user interest in the blog. This information is derived from how fast the user clicks on blogs from the different sources. For example, a blog that the user reads immediately after a new post is displayed in the list before a new post that takes the user days to read. If a user is looking for a new blog, some feed readers generate recommendations by comparing the user's current feeds to other people with similar interests and identifying the popular blogs among those similar readers.

Feed readers also display statistics about the usage of the blogs, including the percentage of posts from a single source that the user has read. From this information, the user can infer that a certain blog has become obsolete. As a result, the user removes the blog from the blog feed. Thus, feed readers only provide information about a single media source (blogs) and the statistics provide the user with information, but do not affect the information displayed except to rearrange what the user already selected.

SUMMARY OF THE INVENTION

In one embodiment, a model generation engine generates a model based on user data from heterogeneous data sources subject to the user approving usage of such data, such as prior user action across a range of media including search, social activity and activity of third party websites. A scoring engine receives candidate content items from heterogeneous data sources and a collaborative filtering engine, compares the candidate content items to the model and computes a score for each item based upon the interestingness of the item to the user. The candidate content items are then presented as a stream of content that is ordered according to the scores.

In another embodiment, the scoring engine distributes the stream of content in a social network. The user's stream of content is shared with the user's friends. This allows friends to stay informed about their friends' activities, and it also provides a source for interesting content because friends are frequently interested in similar things. In another embodiment, using the content stream module in a social network provides an additional layer of refinement of the data by tracking the user's interactions with websites, including user preferences, user interest, comments, tags and searches.

In some examples, the scoring engine generates an explanation (called a property) for each piece of content. The explanation takes a variety of forms including a tag with a user interest that prompted the match or a full sentence. This provides the user with an understanding of why he or she is presented with each content item. In some cases, the user provides feedback about whether the item was interesting or confirmation or rejection of the reasoning. The feedback becomes part of the model. In another embodiment, the content item is displayed in a decision tree that is organized from broad to narrow topics. This information is used to improve the accuracy of the system. For example, if a content item is interesting, similar items will be served in the future.

In one embodiment, the specification includes a method for generating a stream of content for a user by generating a model based on at least one interest of the user and at least one from a group of heterogeneous data sources, generating a set of candidate content items, computing a score for each candidate content item in the set using the model and based upon interestingness of the candidate content item to the user and generating the stream of content from candidate content items using the score of each candidate content item.

BRIEF DESCRIPTION OF THE DRAWINGS

The specification is illustrated by way of example, and not by way of limitation in the figures of the accompanying drawings in which like reference numerals are used to refer to similar elements.

FIG. 4b is a graphic representation of a user interface that is generated by the user interface engine for defining heterogeneous data sources and modifying interests in a stream of content.

FIG. 5*b* is a graphic representation of a user interface that displays a tree of subject matter.

DETAILED DESCRIPTION OF THE PREFERRED EMBODIMENTS

Figure 1A:
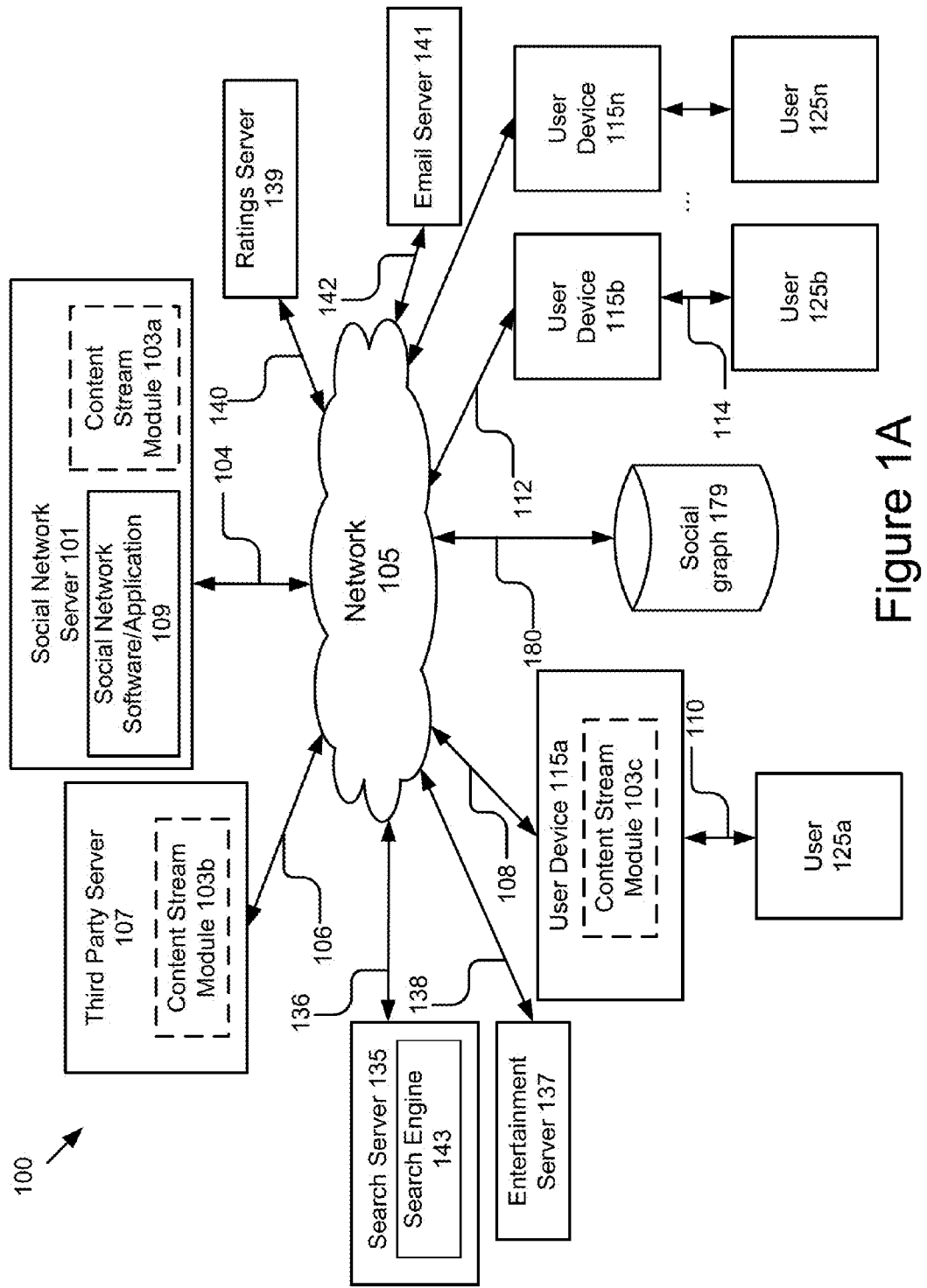
FIG. 1a is a high-level block diagram illustrating one embodiment of a system for generating a stream of content.

A system and method for generating a stream of content is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1*a* illustrates a block diagram of a system 100 for generating a stream of content according to one embodiment. The system 100 generates a stream of content that includes user devices 115*a*, 115*b* that are accessed by users 125*a*, 125*b*, a social network server 101 and a third party server 107. In the illustrated embodiment, these entities are communicatively coupled via a network 105. Although only two devices are illustrated, persons of ordinary skill in the art will recognize that any number of user devices 115*n* are available to any number of users 125*n*.

The user devices 115a, 115b in FIG. 1 are used by way of example. While FIG. 1 illustrates two devices, the embodiment applies to any system architecture having one or more user devices. Furthermore, while only one network 105 is coupled to the user devices, 115a, 115b, the social network server 101 and the third party server 107, in practice any number of networks 105 can be connected to the entities. Furthermore, while only one third party server 107 is shown, the system 100 could include one or more third party servers 107.

In one embodiment, the content stream module 103a is operable on the social network server 101, which is coupled to the network via signal line 104. The social network server 101 also contains a social network software/application 109. Although only one social network server 101 is shown, persons of ordinary skill in the art will recognize that multiple servers may be present. A social network is any type of social structure where the users are connected by a common feature, for example, Orkut. The common feature includes friendship, family, work, an interest, etc. The common features are provided by one or more social networking systems, such as those included in the system 100, including explicitly-defined relationships and relationships implied by social connections with other online users, where the relationships form a social graph. In some examples, the social graph can reflect a mapping of these users and how they are related.

In another embodiment, the content stream module 103b is stored on a third party server 107, which is connected to the network via signal line 106. In yet another embodiment, the content stream module 103c is stored on a user device 115a, which is connected to the network via signal line 108. The user 125a interacts with the user device 115a via signal line 110. Similarly, the user device 115b is coupled to the network 105 via signal line 112 and the user 125b interacts with the user device 115b via signal line 114. Persons of ordinary skill in the art will recognize that the content stream module 103 can be stored in any combination on the devices and servers.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

The content stream module 103 receives data for generating a content stream from heterogeneous data sources. In one embodiment, the content stream module receives data from a third party server 107, a social network server 101, user devices 115a, 115b . . . 115n, a search server 135 that is coupled to the network 105 via signal line 136, an entertainment server 137 that is coupled to the network 105 via signal line 138, a ratings server 139 (e.g. for Google Hotpot or other ratings websites) that is coupled to the network 105 via signal line 140, an email server 141 that is coupled to the network 105 via signal line 142 and a social graph 179 that is coupled to the network 105 via signal line 180. In one embodiment, the search server 135 includes a search engine 143 for retrieving results that match search terms from the Internet. In one embodiment, the search engine 143 is powered by Google®. The content stream module 103 generates a model based on the data from the heterogeneous data sources, receives candidate content items from heterogeneous data sources, compares the candidate content items to the model and generates a stream of content.

Content Stream Module 103

Figure 1B:
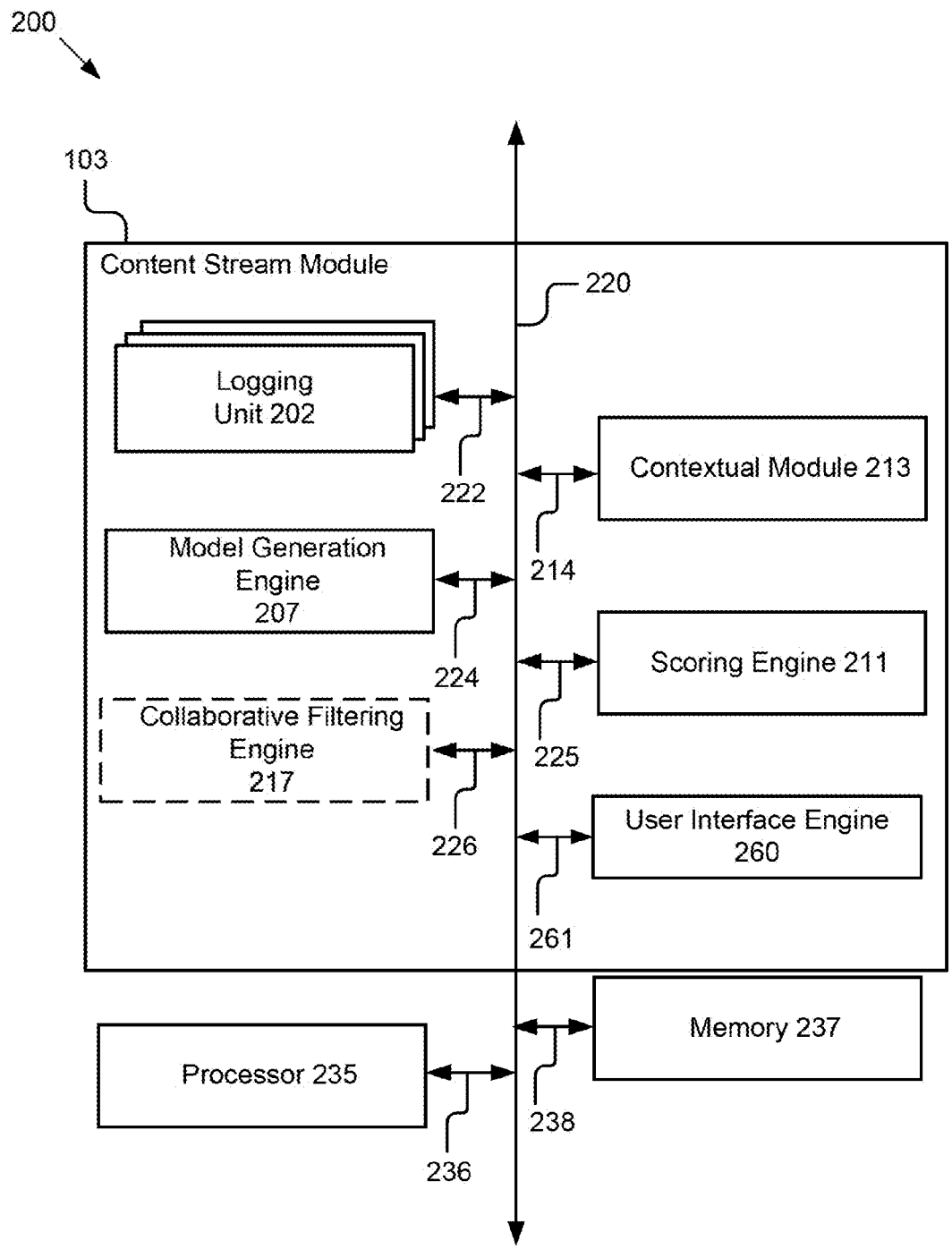
FIG. 1b is a block diagram illustrating one embodiment of a content stream module.

Referring now to FIG. 1b, the content stream module 103 is shown in more detail. FIG. 1b is a block diagram of a computing device 200 that includes the content stream module 103, a memory 237 and a processor 235. In one embodiment, the computing 200 device is a social network server 101. In another embodiment, the computing device 200 is a third party server 107. In yet another embodiment, the computing device 200 is a user device 115a.

Figure 2:
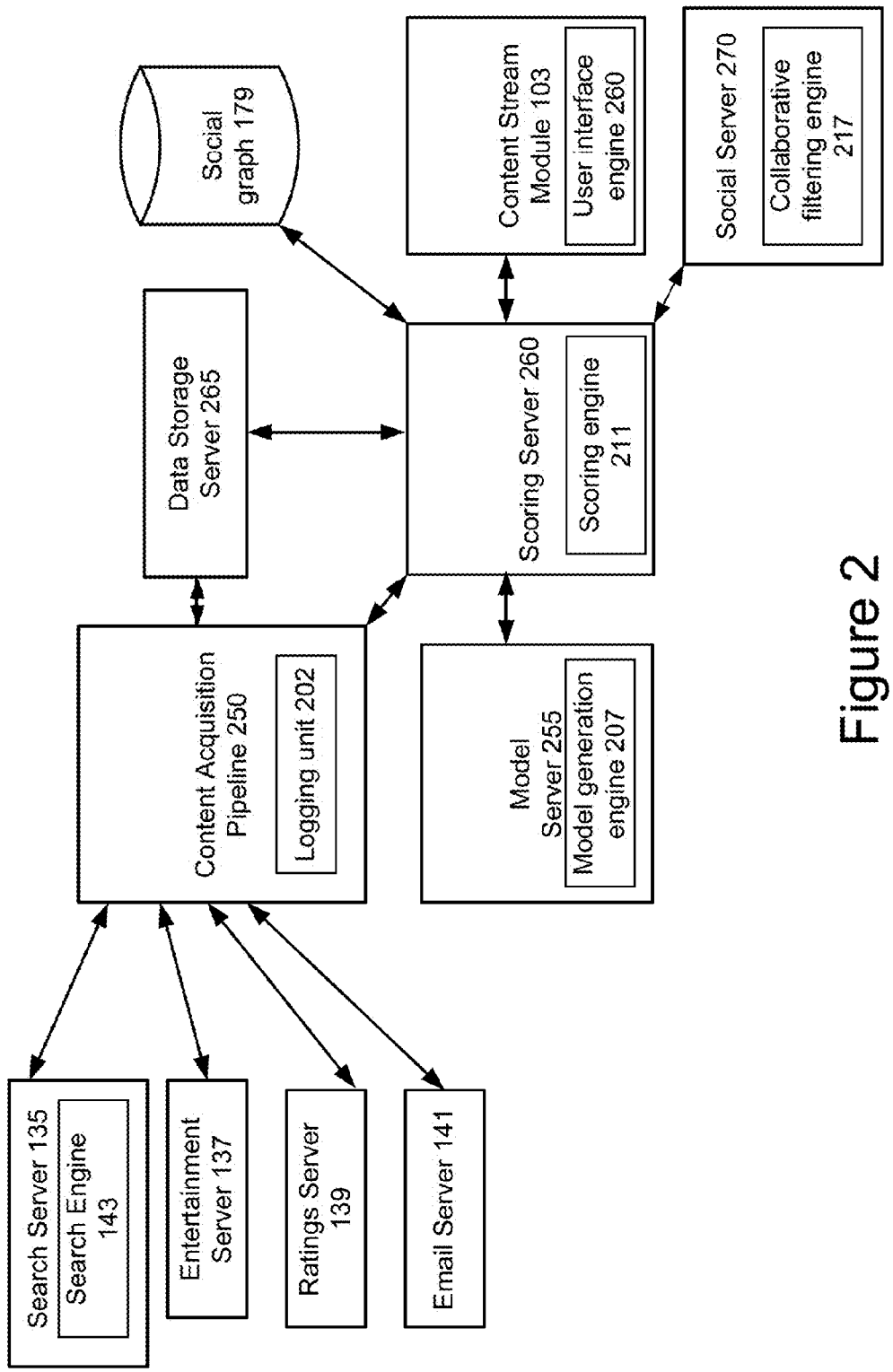
FIG. 2 is a high-level block diagram illustrating another embodiment of a system for generating a stream of content.

The processor 235 comprises an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components via signal line 238. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

In one embodiment, the content stream module 103 comprises a logging unit 202, a model generation engine 207, a contextual module 213, a scoring engine 211, optionally, a collaborative filtering engine 217 and a user interface engine 260.

The logging unit 202 is software including routines for receiving information about a user's interests and social connections (subject to the user opting into data collection) and for generating a log. In one embodiment, the logging unit 202 is a set of instructions executable by the processor 235 to provide the functionality described below for generating the log. In another embodiment, the logging unit 202 is stored in the memory 237 of the computing device 200 and is accessible and executable by the processor 235. In either embodiment, the logging unit 202 is adapted for cooperation and communication with the processor 235 and other components of the computing device 200 via signal line 222.

The logging unit 202 obtains information about users that opt-in to having data collected from user input and/or prior actions of a user across a range of heterogeneous data sources including search (such as web, video, news, maps, alerts), entertainment (such as news, video, a personalized homepage, blogs, a reader, gadget subscriptions), social activity (such as interactions through email, profile information, text messaging such as short message service (SMS), microblogs, geographical locations, comments on photos, a social graph and other social networking information) and activity on third-party sites (such as websites that provide ratings, reviews and social networks where users indicate that they approve of content). This information is derived, for example, from a user's search history, browsing history and other interactions with the Internet. The logging unit 202 generates a log from the information. The log contains the received information and a designation of the source of the information.

The activities of the logging unit 202 described herein are performed subject to user consent. In some implementations, a user is prompted to explicitly allow data collection. Further, the user may opt in/out of participating in such data collection activities. Furthermore, the collected data can be anonymized prior to performing the analysis to obtain the various statistical patterns described above. If a user opts out of data collection, the stream of content is generated based on an anonymized global model.

In one embodiment, there are multiple logging units 202 that each receive data from a different heterogeneous data source. In another embodiment, the data is received by the same logging unit 202. The logging unit 202 transmits the log to memory 237 for storage. In one embodiment, the memory 237 partitions the logs from each heterogeneous data source in a separate data storage location. In another embodiment, the data from heterogeneous data sources is stored in the same location in the memory 237. In yet another embodiment, the memory 237 partitions the model and the stream of content into separate storage locations as well.

The model generation engine 207 is software including routines for retrieving the log from the memory 237 and generating a model based on the log. In one embodiment, the model generation engine 207 is a set of instructions executable by the processor 235 to provide the functionality described below for generating the model. In another embodiment, the model generation engine 207 is stored in the memory 237 of the computing device 200 and is accessible and executable by the processor 235. In either embodiment, the model generation engine 207 is adapted for cooperation and communication with the processor 235 and other components of the computing device 200 via signal line 224.

The model generation engine 207 receives user information from a variety of sources including, for example, queries, clicks, news clicks, gadgets, email interactions, etc., extracts features from the information and generates a model based on the extracted features. The model consists of various types of relevance of items to users, along with floating point values to indicate the extent to which the relevance holds. Examples include liking a source, a primary location, and a list of interests. The interests are generated from explicit information and inferred information. Explicit information is derived, for example, from a user's list of interests on a social network or indicating that they liked a particular content item. Inferred information takes into account a user's activities.

The model generation engine 207 will infer that a user is interested in a particular subject, for example, if the subject matter appears in search terms. For example, the model generation engine 207 infers that a user who searches for information about different types of butterflies is interested in butterflies. If the user also searches for hiking equipment, the model generation engine 207 further infers that the user is interested in outdoor activities, such as nature walks and visiting parks. If the user subscribes to a blog about cooking, the model generation engine 207 infers that the user is interested in cooking. If the user clicks on Artist X articles in Google News, the model generation engine 207 infers that the user is interested in pop music. If the user repeatedly uses a mapping application to obtain directions to a fast food restaurant, the model generation engine 207 infers that the user is interested in the fast food restaurant. If the user plays chess using a chess gadget, the user is interested in chess. If the user subscribes to a "Best of Boxing" YouTube channel, the model generation engine 207 infers that the user is interested in boxing. The model generation engine 207 can even infer information based on the user's friend's activities. For example, content items that interest the user's friends might also interest the user. As a result, in one embodiment, the model includes the user's friends' interests.

In one embodiment, the model generation engine 207 also generates a model that contains several pieces of global meta-information about the user's consumption patterns including how frequently the user consumes the stream of content and global statistics on how likely the user is to reshare various types of items. Lastly, the model includes a sequence of weights and multipliers that are used to make predictions about the user's likelihood of clicking on, sharing or otherwise engaging with stream items.

The model generation engine 207 generates the model from the logs across the heterogeneous data sources. In one embodiment, the model generation engine 207 builds extensions to the model that employ the patterns of behavior of other users. For example, the model predicts the user's behavior based on the reaction of similar users. All the data that is derived from other users is anonymized before it is incorporated into the model.

In one embodiment, the model generation engine 207 generates a model in response to a user opting in with a specific piece of information, for example, allowing the model generation engine 207 to include the user's search history or third party accounts into the model. Alternatively, the model generation engine 207 receives periodic updates (one hour, one day, one week, etc.) from the heterogeneous data sources and in turn updates the model.

In yet another embodiment, the model generation engine 207 generates a model each time the user requests a stream of content. The advantage of this method is that the newest updates are included and the model is current. The disadvantage is that generating the model and then comparing the candidate content items to the model to generate the stream of content takes more time than comparing the candidate content items to a pre-existing model. The model generation engine 207 transmits the model to memory 237 for storage.

The contextual module 213 is software including routines for identifying contextual clues from a request for a content stream. In one embodiment, the contextual module 213 is a set of instructions executable by the processor 235 to provide the functionality described below for identifying contextual clues. In another embodiment, the contextual module 213 is stored in the memory 237 of the computing device 200 and is accessible and executable by the processor 235. In either embodiment, the contextual module 213 is adapted for cooperation and communication with the processor 235 and other components of the computing device 200 via signal line 214.

The contextual module 213 receives a request for a stream of content from a website or an application each time the user visits the website or activates an application that includes the content stream module 103. In another embodiment, the user requests the stream of content. In either case, the contextual module 213 receives the request and determines contextual clues from the request. For example, the contextual module 213 determines the location of the user (based, for example, on the user's IP address), the time of day and any other contextual clues. The contextual module 213 transmits the contextual clues to the scoring engine 211 via signal line 214.

The scoring engine 211 is software including routines for generating a stream of content from candidate content items. In one embodiment, the scoring engine 211 is a set of instructions executable by the processor 235 to provide the functionality described below for generating a stream of content. In another embodiment, the scoring engine 211 is stored in the memory 237 of the computing device 200 and is accessible and executable by the processor 235. In either embodiment, the scoring engine 211 is adapted for cooperation and communication with the processor 235 and other components of the computing device 200 via signal line 225.

In one embodiment, the scoring engine 211 queries heterogeneous data sources for candidate content items related to search terms, receives the candidate content items and compares the candidate content items to the model to determine whether the user would find the candidate content items interesting. The heterogeneous data sources include a search engine 143, an entertainment server 137, an email server 141, a ratings server 139, a social network server 101 and a third party server 107.

The query is derived from the user's interests, social connections and, in one embodiment, recent search terms input by the user. In one embodiment, the scoring engine 211 also uses contextual clues transmitted from the contextual module 213 to further narrow the number of candidate content items. For example, the scoring engine 211 queries the search engine 143 for items related to skiing because it is an explicit interest, sports car because it is a recent search term and sports car and skiing in Montana because the user's IP address is in Montana.

In one embodiment, the scoring engine 211 first performs the query and then compares the results to the model to determine whether the user would find them interesting. In another embodiment, these steps are performed simultaneously. In yet another embodiment, the scoring engine 211 compares candidate content items to the model and then filters the results according to the subject matter of the queries.

The scoring engine 211 determines interestingness based on social relevance and an interest match of the item to the user. Social relevance refers to whether a content item is new and determined to be valuable by people of a similar demographic to the user. For example, if the user is 13 and enjoys pop music, the user might be interested in content items about a new artist named Artist X. The interest match of the item to the user is determined based on similarity of the content item to the model.

The interestingness is measured by calculating a score for each candidate content item. In one embodiment, the scoring engine 211 incorporates historical interaction feeds into the scoring. In one embodiment, the candidate items are not displayed unless their candidate scores exceed a certain threshold. Once the scores are calculated and thresholds are exceeded, the scoring engine 211 generates a stream of content that is ordered according to the candidate content item scores. In one embodiment, the scoring engine 211 generates a user interface that includes the stream of content. The user interface is displayed as part of another application, such as a social network, or as its own standalone application.

In one embodiment, the scoring engine 211 also generates an explanation for each item in the stream of content. The explanation is presented in a variety of ways including a tag that contains the subject matter of the content item (skiing) or a more detailed explanation (your friends enjoyed this article). Other explanations include that the content item matches a specific user interest or is similar to other content items that the user has liked in the past. The user's reaction to the explanation is used to further refine the model. This process is discussed in more detail below in connection with FIG. 3, which illustrates a more detailed block diagram of the scoring engine 211.

In one embodiment, the model contains two levels: (1) explicit user interests that are displayed to the user as explanations for generating a particular content item; and (2) a mathematical model that is not displayed to the user. The second level is used for scoring and more complicated analysis of subject matter. For example, a content item is described in the first level as relating to bicycling. In the second layer, the model generation engine 207 identifies the user as being most interested in competitive mountain biking.

Turning back to FIG. 1b, the collaborative filtering engine 217 is software including routines for generating additional candidate content items through collaborative filtering and transmitting the additional candidate content items to the scoring engine 211 that were derived from collaborative filtering. In one embodiment, the collaborative filtering engine 217 is a set of instructions executable by the processor 235 to provide the functionality described below for generating additional candidate content items. In another embodiment, the collaborative filtering engine 217 is stored in the memory 237 of the computing device 200 and is accessible and executable by the processor 235. In either embodiment, the collaborative filtering engine 217 is adapted for cooperation and communication with the processor 235 and other components of the computing device via signal line 226.

The collaborative filtering engine 217 obtains candidate content items that are socially relevant from a stream of content derived from people with whom the user has a relationship and transmits the candidate content items to the scoring engine 211. For example, the stream of content is derived from friends in a social network or people that the user frequently emails. The more important that the person appears to be to the user, the more likely that the user will be interested in the content item. Thus, in one embodiment, the collaborative filtering engine 217 applies a weight to candidate content items based on the social relationship of the user to the friend. For example, users that are friends receive higher weights than candidate content items from second generation friends of the user (i.e. a friend of a friend).

Even if the user is not interested in the item, the user may read the item because he knows it is important to the other person. For example, if the user's parent is researching assisted living homes, the user will want to become informed about the homes, even though the information is not interesting, per se. The information is still relevant.

In another embodiment, the collaborative filtering engine 217 selects candidate items based on shared similarities between users. For example, if the user has children, the collaborative filtering engine 217 selects candidate content items from other users that also have children.

The collaborative filtering engine 217 increases the weights applied to candidate content items from friends when the user positively responds to the items. For example, if the user comments on the item or indicates that the user found the item interesting, the collaborative filtering engine 217 increase the weight so that more candidate content items from the friend become part of the stream of content.

The user interface engine 260 is software including routines for generating a user interface that displays the stream of content, receives user feedback and allows the user to add or remove explicit interests. In one embodiment, the user interface engine 260 is a set of instructions executable by the processor 235 to provide the functionality described below for generating a stream of content. In another embodiment, the user interface engine 260 is stored in the memory 237 of the computing device 200 and is accessible and executable by the processor 235. In either embodiment, the user interface engine 260 is adapted for cooperation and communication with the processor 235 and other components of the computing device 200 via signal line 261.

Alternate Embodiment of the System

FIG. 2 is a high-level block diagram illustrating another embodiment of a system for generating a stream of content. In this embodiment, the components of the content stream module 103 are divided among various servers so that the information is efficiently processed. The system includes a search server 135, an entertainment server 137, a ratings server 139, an email server 141, a content acquisition pipeline 250, a data storage server 265, a model server 255, a scoring server 260, a social graph 179, a social server 270 and a content stream module 103.

The heterogeneous data sources (search server 135, entertainment server 137, ratings server 139 and email server 141) are crawled by a content acquisition pipeline 250 or are directly transmitted to the content acquisition pipeline 250.

The content acquisition pipeline 250 includes a logging unit 202 for annotating the content items with specific tags, such as features and a global score and generating logs of user activities. The activities described herein are subject to the user consenting to data collection. Once the content items are annotated, the logging unit 202 transmits the data to the data storage server 265. The data storage server 265 indexes the features of each content item and stores them in at least one database. In one embodiment, the content items are organized according to an identification format (SourceType#UniqueItemID), for example, "YOUTUBE#video_id" and "NEWS#doc_id"), an item static feature column that holds an item's static features (title, content, content classification, etc.), an item dynamic feature column that holds an item's dynamic features (global_score, number of clicks, number of following, etc.), a source (src) static feature column where the source is a publisher of an item (NY Times in news, video uploading in YouTube, etc.), a src dynamic feature column holds the source's dynamic features, a content column holds activities that were used to create activities and a scoring_feature holds a proto message that is used for user scoring.

In one embodiment, the data storage server 265 dynamically phases out the content items. For example, news items expire after 24 hours, videos expire after 48 hours and feeds are kept for 24 hours or only the 10 most recent items, whichever is larger.

The content acquisition pipeline 250 also transmits the content items to the scoring server 260 for a global user ranking. The global scores are transmitted from the scoring server 260 to the data storage server 265, which stores the global scores in association with the content items. The global scores are helpful for organizing the content items in the data storage server 265 according to the more popular items.

Turning now to the model server 255, the model server 255 receives the user activity from the logging unit 202 or the data storage server 265. The model generation engine 207 generates the model based on user input and/or prior actions. The model server 255 transmits a model to the scoring server 260 periodically or upon request.

In one embodiment, the scoring server 260 requests the model responsive to receiving a request for a stream of content from the content stream module 103. The scoring server 260 receives the model from the model server 255. The scoring server 260 requests and receives user candidates from the social graph 179. The scoring server 260 requests and receives candidate content items from the data storage server 265. The scoring server 260 requests and receives candidate content items from the social server 270. The candidate content items from the social server 270 are pre-scored and, in one embodiment, the unread candidate content items are saved to a cache on the social server 270. These items are saved to a cache because the quantity of social updates can be large enough that performing the scoring during write time enables faster reads.

The scoring engine 211 compares the candidate content items to the model and scores the candidate content items. In the case of candidate content items from the social server 270, the scoring engine 211 receives the candidate content items from the social server 270, compares the candidate content items to the model and rescores the candidate content items according to the model. The scoring engine 211 generates a stream of content based on the scored candidate content items and transmits the stream of content to the content stream module 103.

The content stream module 103 includes a user interface engine 260 that receives the stream of content from the scoring server 260 and displays it in a user interface. In addition to displaying the stream of content, the user interface provides the user with icons for changing the settings and user interests. The icons will be explained in greater detail below with regard to FIGS. 4-5.

Scoring Engine 211

Figure 3:
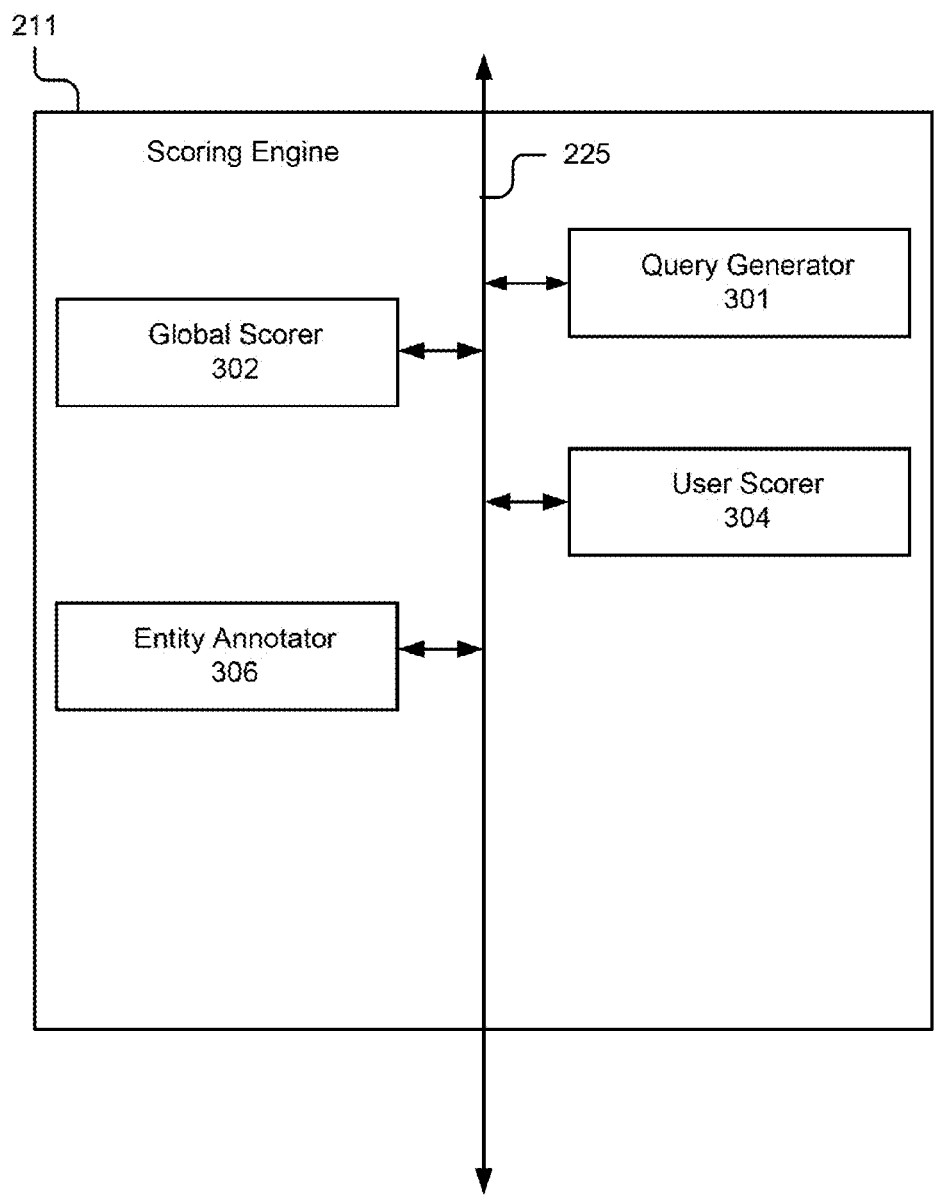
FIG. 3 is a block diagram of one embodiment of the scoring engine in more detail.

Referring now to FIG. 3, one embodiment of a scoring engine 211 is shown in more detail. This embodiment is discussed in conjunction with FIG. 2. The scoring engine 211 includes a query generator 301, a global scorer 302, a user scorer 304 and an entity annotator 306 that are each coupled to signal line 225.

The global scorer 302 is used to rank all content items that are stored in the data storage server 265 or memory 237 (depending upon the embodiment). The global scorer 302 uses signals from the different verticals and log data to compute a global user-independent score for each content item to approximate its popularity or importance within the stream that produced it. The global scorer 302 normalizes the score across streams so that items from various streams are comparable to aid in generating a quick yet reasonable ranking of items. The global score is a combination of its quality specific to the source stream (depending on the rank of the source, number of known followers of a source, etc.) and its global popularity (trigger rate on universal search, relevance to trending queries, number of clicks, long clicks received, etc.).

The global scorer 302 transmits the global score to storage where it is associated with the content item. The global score helps rank the content items for faster retrieval. For example, if the query generated by the query generator 301 includes a request for the top ten items about skiing, those items are already organized in the data storage server 265 or memory 237 according to the global score.

The query generator 301 generates a query for users that would find a content item interesting. There are two types of queries: the first suggests users based on their interest in the item and the second suggests users based on their social connection to the item.

For an interest based query, a candidate content item must be interesting to the user and must exceed a quality threshold based on the user's interest. The quality threshold contains components covering the global quality of the item, and the quality with respect to the user's location, as well as optionally a set of additional quality scores such as the burstiness and geo-burstiness of the item. Burstiness refers to the extent to which the item's popularity has sharply increased. Geo-burstiness refers to the extent to which the item's popularity has sharply increased in a specific geographic area.

The following is one form of the query associated with a user: ((llama_farming AND (global_score>80 OR local_score>10 OR burstiness>15)) OR (from_techwebsite AND (global_score>150 OR local_score>15 OR burstiness>8)) OR ( . . . ). The user may be moderately interested in llama farming and good material on this subject may be hard to come by, yielding a relatively low threshold on global score and the other scores. The user is less interested in content from the technology website and this content is higher in both volume and quality, so the resulting threshold is higher to gate the technology website content to an appropriate flow rate. These thresholds are recomputed nightly based on the activity during the day.

For the social based query, consider the following two example use cases. First, a user comments on a news item and the content item becomes interesting to the user's friend. Second, a video arrives in the system and social server 270 determines that the sister of the video's uploader will be interested in the content contained in the video. In the first use case, an existing news item propagates through the streams of content of all friends that are linked together. The users are passed to the scoring engine 211 as pre-computed candidate users and need not be analyzed by the user scorer 304. This allows the scoring engine 211 to respond in real-time to updates to the social graph 179. The second use case involves social connections that are not explicit to the social network memberships. These social connections are the responsibility of the scoring engine 211. When an item arrives with metadata about the author and any other users that are associated with the item, the query generator 301 queries the social graph 179 to determine whether any candidates from the social graph are interested in the item. If so, the candidate user will be added and decorated with information about the nature of the relationships that makes this user a candidate for the item.

The query is transmitted to the social graph database 179 and users matching the query are returned to the scoring engine 211. The user scorer 304 receives the candidate content items from heterogeneous data sources through the content acquisition pipeline 250 or the data storage server 265 and receives the list of users associated with the candidate content items from the query generator 301. In one embodiment, the user scorer 304 receives candidate content items directly from the source, for example, from a microblog. The user scorer 304 then computes a score for a single user and item pair based on the model, including user preferences for various types of content items, including suitable multipliers for the scoring model and the complete description of the item, including the entities it refers to, its various popularity signals (global and geo-specific popularity, both in absolute terms as well as in the rise in popularity).

In one embodiment, the user scorer 304 generates an activity identification, a user identification, an action type (e.g. recommend candidate content item for stream of content), a score, a score version, a score timestamp, a stream type (e.g. YouTube, feed, news, SMS, etc.), a stream source (e.g. newspaper X, school Y, etc.) and a bloom filter.

In one embodiment, the user scorer 304 employs a probabilistic method that evaluates the probability that an item will be present in a user's stream. The random variables used to compute this probability is the lattice of various subsets of properties (entities, global and local scores, source type, source, etc.) shared between the item and the user. For a suitably rich set A of attributes, the random variable "item" is independent of the random variable "user," given the values of the attributes A. Thus for any setting {A=a} of the attributes, Pr(item|A=a, user)=Pr(item|A=a). Therefore, summing over all possible values a of A, obtains $$Pr(item \mid user) = \sum_p Pr(item \mid p) Pr(p \mid user),$$

where p is a property, that is, a setting A=a of the attributes. The latter quantity, Pr(p|user), is something we can approximate from the user's history of interactions with content items as well as user search history and other opt-in data. Similarly, the former quantity, Pr(item|p) is something we can approximate by the (suitably weighted) reciprocal of the number of items with property p (e.g. if it is expected that p=(llama_farming AND (global_score>80 OR local_score>10 OR burstiness>15) to generate 300 items, take Pr(item|p) to be 1/300).

The difficulty of computing Pr(item|user) by the sum above is that the properties expressed in the query corresponding to the user are not independent, and may have correlations to take advantage of. To support this, the user scorer 304 begins with very simple approximations of the following form as a first step:

$$Pr(item \mid user) = G^{-1}\left(\sum_p G(Pr(item \mid p) Pr(p \mid user))\right),$$

where the properties p are summed over single-attribute properties (as opposed to all possible settings of an entire collection of attributes), and G is an exponential function of the form $G(x)=2^{(100\,x)}$, so that when applied in this form, if there are several values of p for which Pr(item|p) Pr(p|user) is large, the sum of their G-values slowly increases.

Referring back to FIG. 3, the entity annotator 306 generates descriptions for each content item. In one embodiment, the entity annotator 306 generates a description for all content items that are stored in the data storage server 265 in association with the content item. In another embodiment, the entity annotator 306 generates an explanation (i.e. a property) for why items were included in the stream of content based on the user's interests. The most important explanations are social (your friend liked/shared/commented on this), entities (because you like monster trucks), queries (because you search for/are interested in [P-38 lightning model airplanes]) and geographic. In one embodiment, the entity annotator 306 incorporates collaborative explanations (because people from school Y/Google/etc. liked this) and some named collaborative explanations (because your brother likes a comic).

The entity annotator 306 also generates a feedback mechanism that is displayed with the explanation, such as like or dislike; approve or disapprove, etc. In another embodiment, the explanation is displayed as a decision tree from a broad subject area to narrower subject areas.

The stream of content is displayed in a user interface that allows the user to share the item with friends, comment on the item, save the item, etc. By sharing the content items with friends, the stream of content is circulated throughout the social network. In one embodiment, the scoring engine 211 automatically distributes content items to friends based on a determined commonality, such as sharing pictures of the user's friends with all family members. As a result, a user's stream becomes a combination of information retrieved from websites and content obtained through friends. This keeps the content interesting and the results fresh.

When a user responds to the explanation by providing feedback, the feedback is transmitted to the model generation engine 207 for incorporation into the log and, as a result, the model. The feedback loop establishes a dynamic model, which is important for two reasons. First, feedback helps train the model when generating the model for the first time. The model is created in part from inferences and these inferences can be wrong. Feedback helps create the most accurate model possible. Second, peoples' interests change and incorporating the feedback makes the model evolve to reflect those changes. For example, a user's taste in music changes such that the user is interested in a particular artist now because she's new but eventually the user will become bored of her music or find better artists. As a result, there will be a point where the user is no longer interested in seeing content items about that particular artist. Incorporating user feedback into the model therefore makes the model stay relevant to the user.

User Interface Engine 260

Figure 4A:
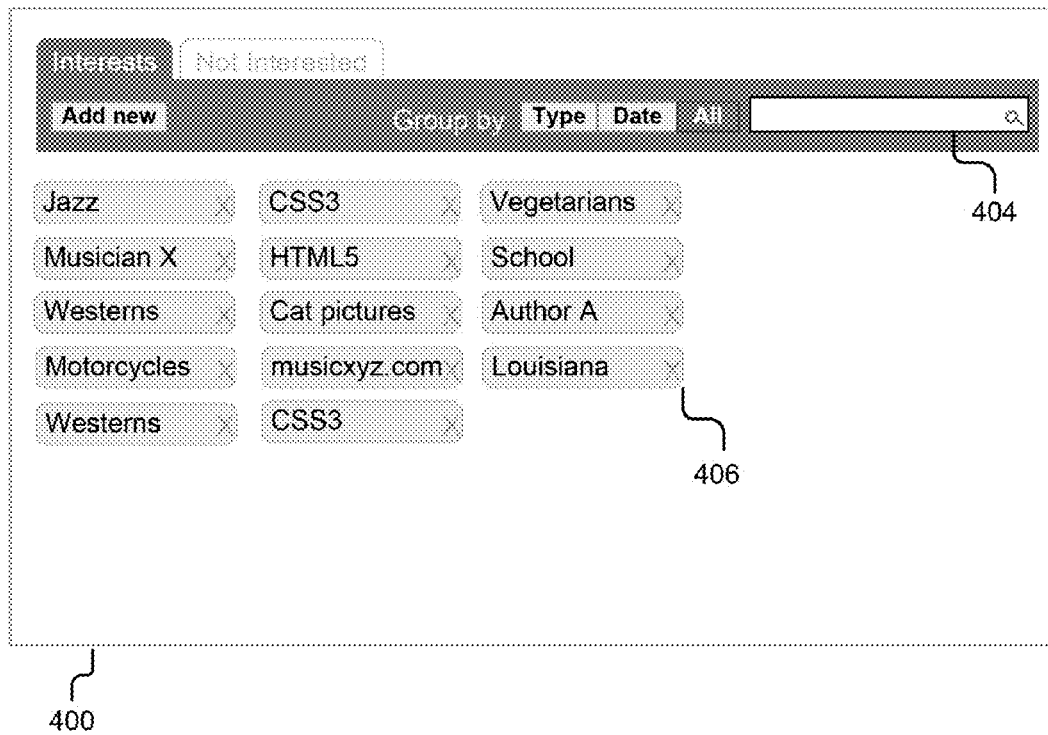
FIG. 4a is a graphic representation of a user interface that is generated by the user interface engine for the user to provide explicit interests.

Turning now to the user interface engine 260, FIG. 4a is a graphic representation 400 of a user interface that is generated by the user interface engine 260 for the user to provide explicit interests. In this example the user can add new interests by inputting words into the search box 404, selecting the search icon and selecting the resulting word. To remove the interests, the user selects the "x" in the icon 406.

Figure 4B:
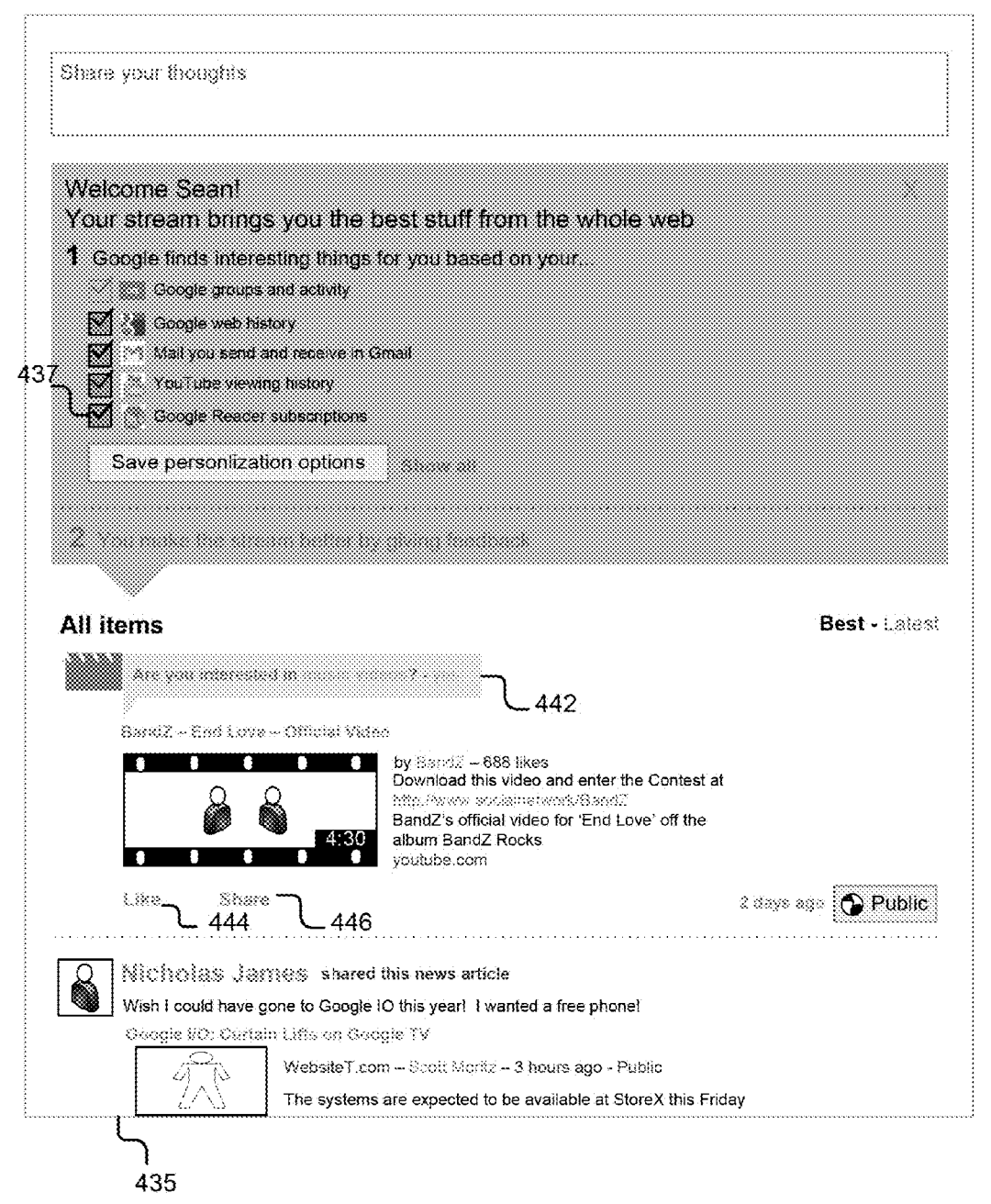

FIG. 4b is a graphic representation 435 of a user interface that is generated by the user interface engine 260 for defining heterogeneous data sources and modifying interests in a stream of content. The user interface engine 260 displays a list of heterogeneous data sources (Google..oo groups and activities, Google web history, mail, YouTube viewing history, and Google Reader subscriptions) that include boxes 437 for selecting whether the system can use those sources in generating the stream of content. The user interface engine 260 also displays different feedback mechanisms for improving the model. In this example, the feedback mechanism includes asking 442 the user if he is interested in music videos and displaying like and share icons 444, 446.

Figure 4C:
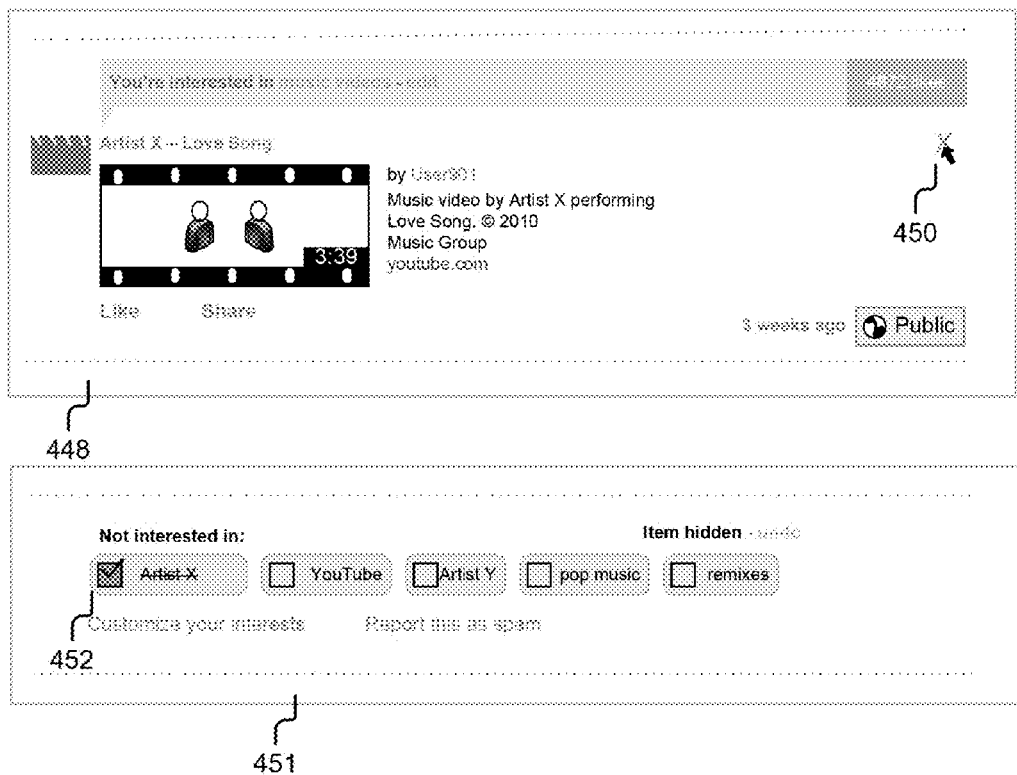
FIG. 4c is another embodiment of a graphic representation of a user interface that is generated by the user interface engine for modifying interests in a stream of content.

FIG. 4c is another embodiment of a graphic representation 448 of a user interface that is generated by the user interface engine 260 for modifying interests in a stream of content. In this example, the user interface displays a Artist X video and the user clicks the x icon 450. This causes the user interface engine 260 to display a graphic representation 451 of interests and generate a negative interest for Artist X, which means that the user will not receive any interest associated with Artist X. The negative interest is displayed as an icon 452 with a strikethrough of Artist X as an interest.

Figure 4D:
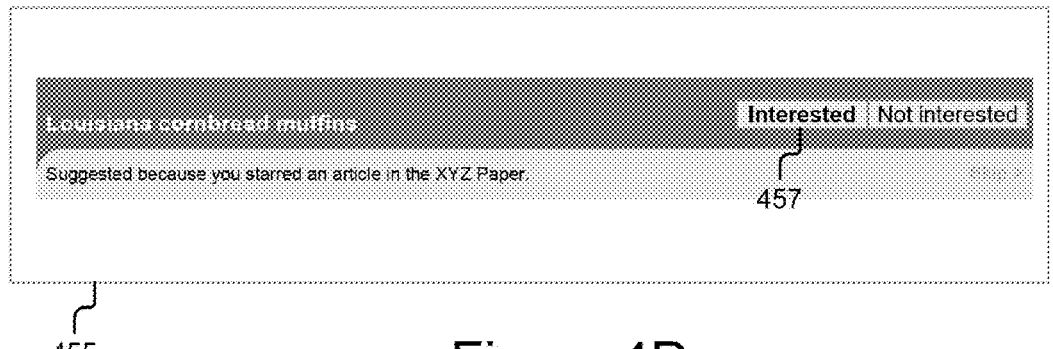
FIG. 4d is a graphic representation of a hypothesized interest.

FIG. 4d is a graphic representation 455 of a hypothesized interest. The user interface engine 260 displays a content item for Louisiana cornbread muffins that is suggested because the user starred an article in newspaper X. If the user selects the interested icon 457, Louisiana cornbread muffins become an explicit interest in the model.

Figure 4E:
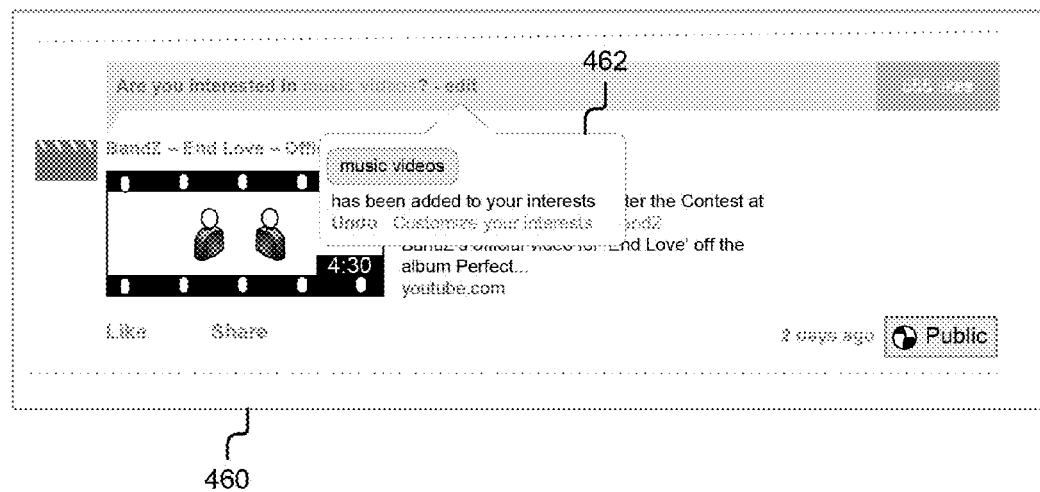
FIG. 4e is a graphic representation of an item that is recommended based on a hypothesized interest.

FIG. 4e is a graphic representation 460 of an item that is recommended based on a hypothesized interest. In this example, a BandZ video is displayed because the user likes music videos. To further remind the user about the personalization sources, the user interface engine 260 displays a popup box 462 to notify the user that music videos were added to the user's list of interests.

Figure 5A:
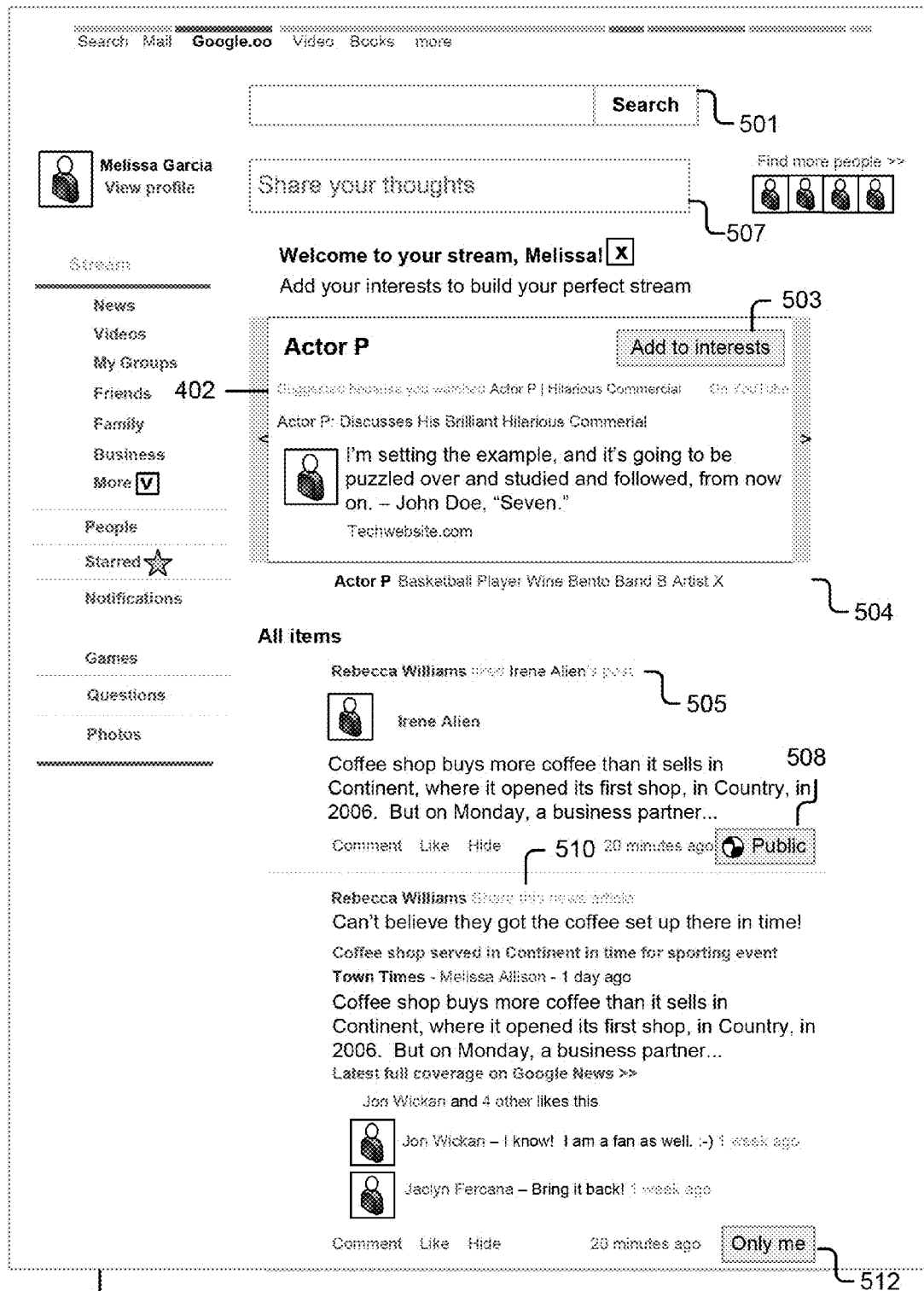
FIG. 5a is a graphic representation of a user interface that displays the stream of content.

Turning now to an example of how the stream of content appears to the user, FIG. 5a is a screenshot of a user interface 500 that displays the stream of content. In this example, the stream of content is displayed as a Google product called Google.oo. This is part of the Google line of products and therefore contains a search bar 501 at the top. Persons of ordinary skill in the art will recognize that other versions of the content stream module 103 are possible that omit the search bar and are privately labeled.

The user is Melissa Garcia and the user interface allows Melissa to generate her own content items that can be distributed among her friends by entering information into the newsfeed bar 507. The default option is to display information from everyone that contributed to Melissa's stream of content. If Melissa wants to see only the content items that she generated, she clicks the only me button 512.

Additionally, the user interface provides the user with options for configuring the stream of content. For example, the "Actor P" item 502 is displayed with a button 503 for adding the item to the user's interests. Furthermore, the "Actor P" item 502 includes an explanation that Melissa received the article about how the "Actor P" is a successful social media campaign because Melissa watched a different Actor P video on YouTube. This item also includes a list 504 of subject matter (Basketball Player, Wine, Bento, Band B, Artist X) that Melissa also might find interesting. When Melissa clicks on any of the subject matter, it gets added to her model as an explicit interest.

The stream of content is displayed below the suggested "Actor P" item 502. Melissa received a notification that her friend Rebecca Williams indicated that she liked the post 505 by Irene Alien. Because users are increasingly concerned with privacy, this content item contains a button 508 indicating that the item is visible to the public. The user interface also displays the original news article that Rebecca Williams commented on. Melissa can distribute the article to her friends by clicking on the share this news article link 410. Below the article is a list of comments from other people.

FIG. 5b is a screenshot of a user interface 550 that displays a tree of subject matter. In this example, Melissa is presented with an article on cockatiel training. The user interface displays a general explanation 552 that she is receiving the article because she listed birds as an interest. If that explanation is still unsatisfactory or if she wants to modify her interests list, selecting the expand explanation button 553 causes an expanded explanation 554 to appear below the article. The expanded explanation 554 contains a breakdown of the different subject matter that has been added to Melissa's interests. The checked boxes 555 indicate subject matter that is part of Melissa's interests (animals, birds, parrots, cockatiels). Interests with an unchecked box 557 (African greys, amazons, parakeets) are not part of Melissa's interests. The user then checks or unchecks the boxes to further clarify her interests.

Methods

Figure 6:
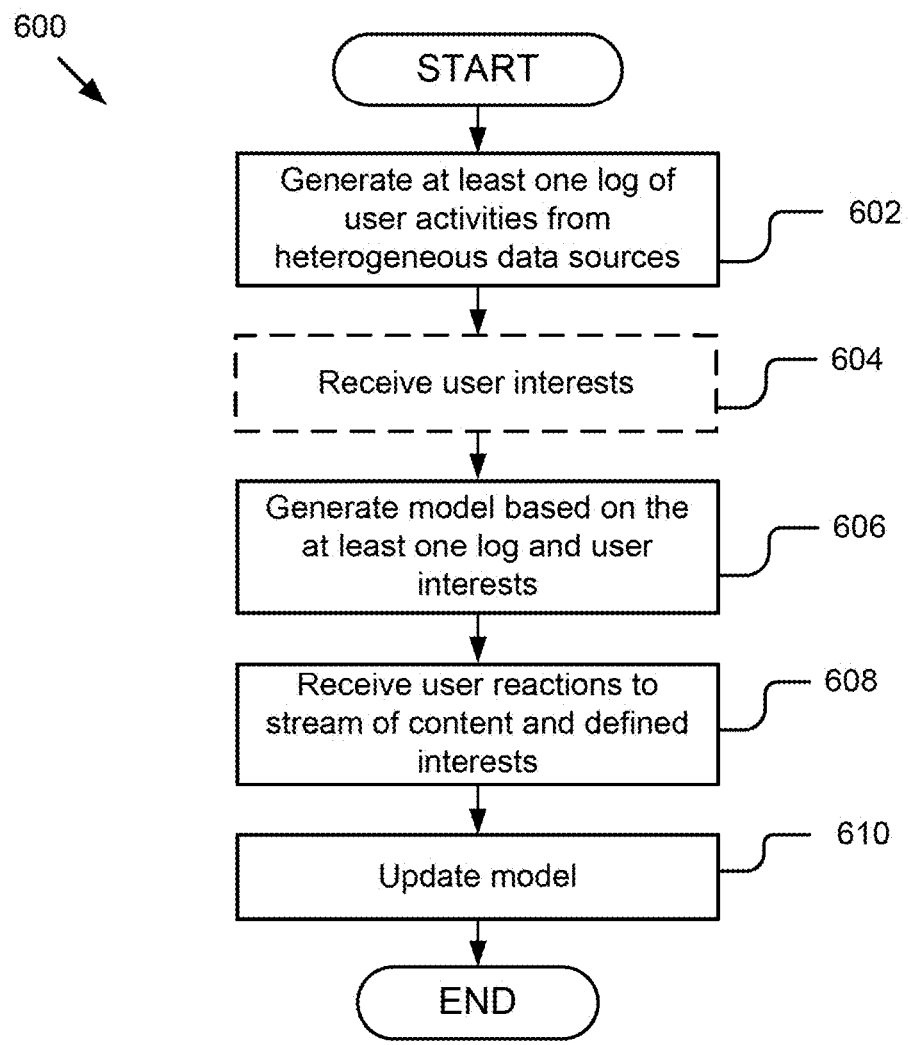
FIG. 6 is a flow diagram of one embodiment of a method for generating a model based on user interests.
Figure 7:
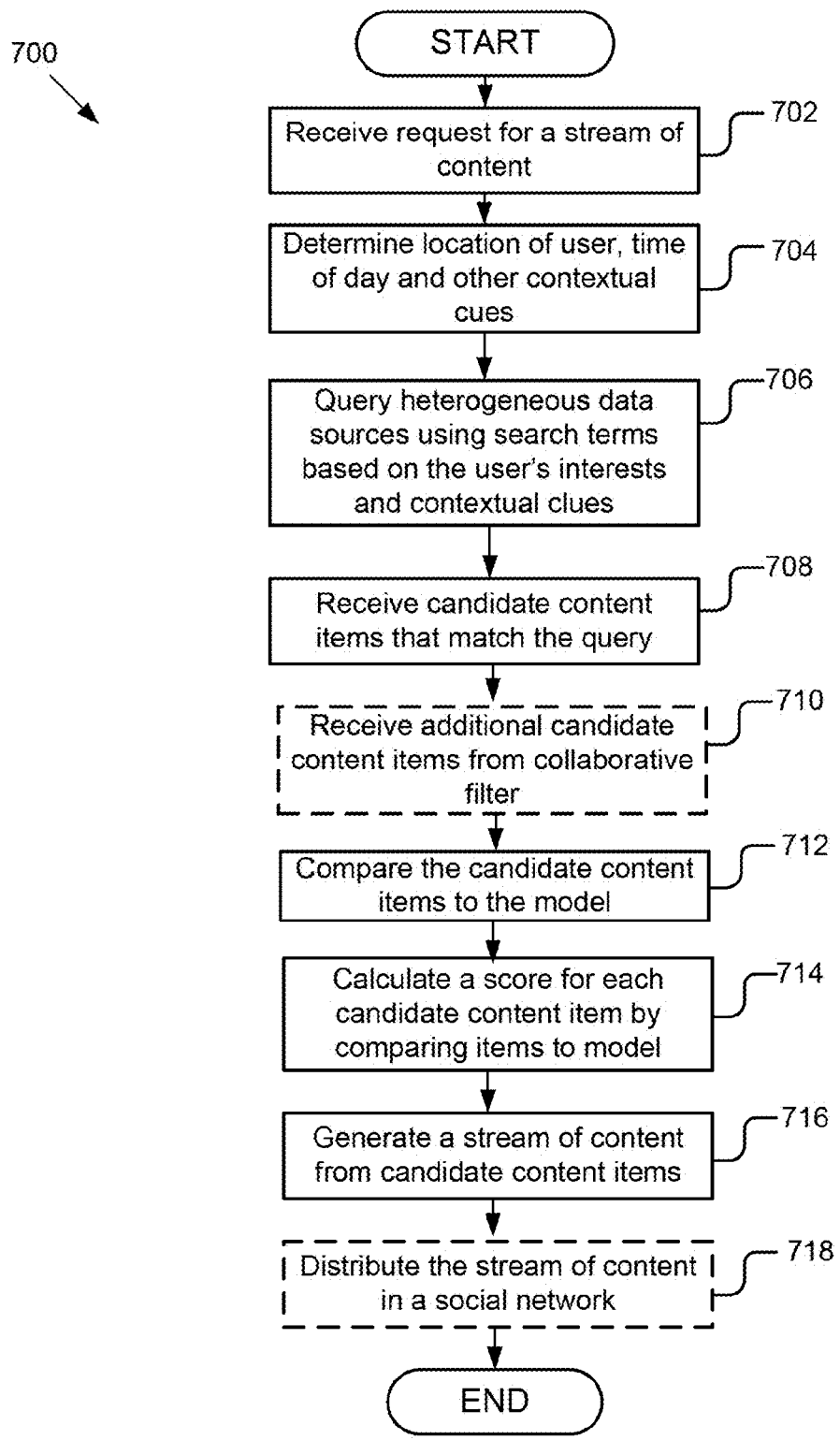
FIG. 7 is a flow diagram of one embodiment of a method for generating a stream of content.
Figure 8:
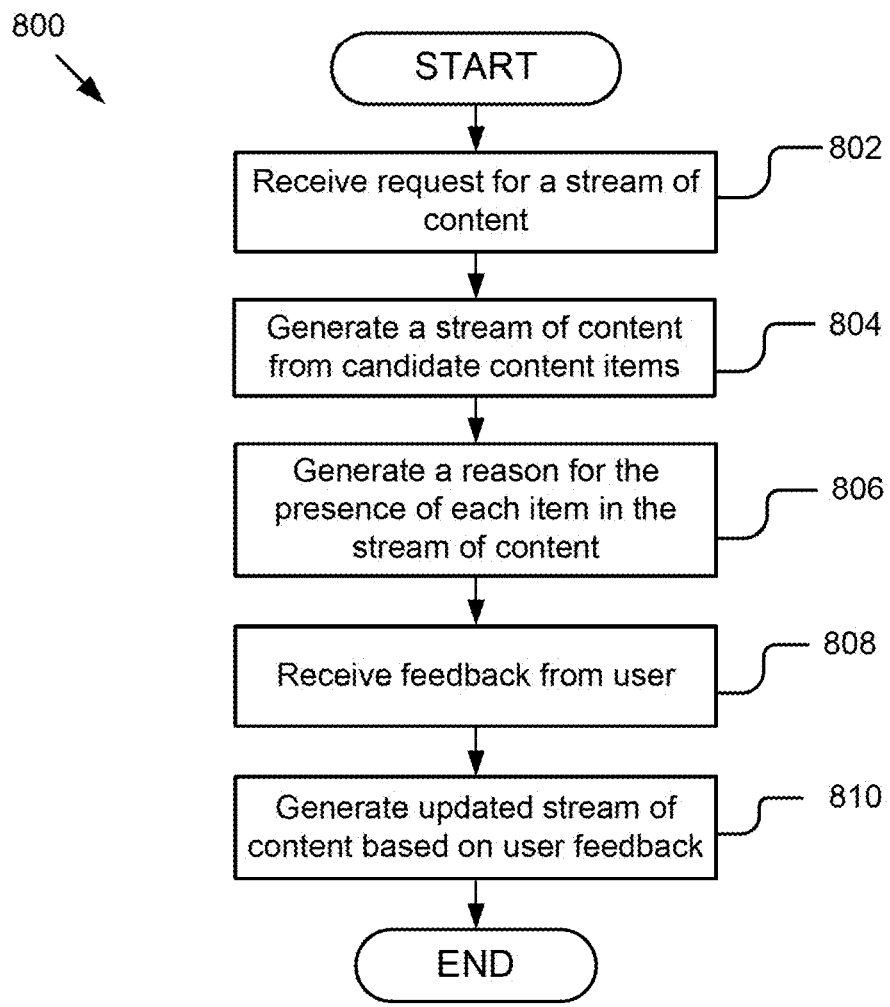
FIG. 8 is a flow diagram of one embodiment of a method for updating a stream of content.

Referring now to FIGS. 6-8, various embodiments of the method of the specification will be described. FIG. 6 is a flow diagram 600 of one embodiment of a method for generating a model. The logging unit 202 receives information about user activities from heterogeneous data sources and generates 602 at least one log of the received information. The heterogeneous data sources include search (such as web, video, news, maps, alerts), entertainment (such as news, video, a personalized homepage, blogs, a reader, gadget subscriptions), social activity (such as interactions through email, profile information, text messaging such as short message service (SMS), microblog, comments on photos, a social graph and other social networking information) and activity on third-party sites (such as websites that provide ratings, reviews and social networks where users indicate that they approve of content). The logging unit 202 transmits the log to memory 237. In one embodiment, the logging unit 202 also receives 604 user interests.

The model generation engine 207 retrieves the at least one log and user interests from memory 237 and generates 606 the model based on the at least one log and user interests. If no log is available, the model generation engine 207 creates a generic model based on global user activities. In one embodiment, the model is generated 606 each time the scoring engine 211 receives a request for a stream of content. In another embodiment, the model is generated periodically.

The scoring engine generates a stream of content by comparing candidate content items to the model. In one embodiment, the stream of content includes an explanation for why at least one content item is being displayed to the user, such as an explanation that it matches one of the user's defined interests. The user reacts to the stream of content, for example, by sharing a link, indicating that the link is interesting or indicating that the suggestion was wrong. The model generation engine 207 receives 608 the user reactions to the stream of content and defined interests. Responsive to receiving the user reactions, the model generation engine 207 updates 610 the model.

FIG. 7 is a flow diagram 700 of one embodiment of a method for generating a content stream. The contextual module 213 receives 702 a request for a stream of content. The request comes directly from a user, from a website or from an application. The contextual module 213 determines 704 a location of the user, a time of day and other contextual clues. The scoring engine 211 queries 706 heterogeneous data sources using search terms based on the user's interests and contextual clues and receives 708 candidate content items that match the query. In one embodiment, the query is based on search terms that were previously submitted by the user. The candidate content items are retrieved from heterogeneous data sources that include, for example, news articles, tweets, blogs, videos, photos, posts on social networks, etc.

In one embodiment, the scoring engine 211 receives 710 additional candidate content items from the collaborative filtering engine 217. These items are derived from the content stream of anyone with whom the user has a relationship. The scoring engine 211 compares 712 the candidate content items to a model.

The scoring engine 211 calculates 714 a score for each candidate content item by comparing the item to the model to determine interestingness to the user. The scoring engine 211 generates 716 a stream of content from the candidate content items. The stream is based on the number of items that can be displayed in the space. In one embodiment, the score of all content items that appear in the stream of content also have to exceed a certain threshold. This ensures that less interesting content is not displayed in situations where there is not enough content to generate a complete stream.

In one embodiment, the scoring engine 211 distributes 718 the stream of content in a social network. The social network helps the stream of content remain fresh and interesting because it helps distribute the information. For example, a user comments on one of the items in the stream of content. The comment appears in the user's friend's stream of content. The user's friend then shares the original item with other friends. Thus, items in the stream of content are circulated throughout the social network.

FIG. 8 is a flow diagram 800 of one embodiment of a method for updating a content stream. The scoring engine 211 receives 802 a request for a stream of content. The scoring engine 211 generates 804 a stream of content from candidate content items based on interestingness to the user. The scoring engine 211 generates 806 a reason for the presence of each item in the stream of content and displays the reason alongside the content in the user interface. The scoring engine 211 also generates a user interface that allows the user to provide feedback about whether the reasons are correct and whether the content items are interesting. The model generation engine 207 receives 808 feedback from the user, which is incorporated into an updated model. The scoring engine 211 receives candidate content items and compares them to the updated model to generate 810 an updated stream of content.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method for generating a stream of content for a user, the method comprising:
  receiving candidate content items from heterogeneous data sources including from other users in at least one social network that have a relationship with the user;
  applying, with one or more processors, a weight to each of the candidate content items from the other users in the at least one social network that have the relationship with the user, the weight being modified based on a degree of separation between the user and each of the other users;

computing, with the one or more processors, a user-independent global score for each of the candidate content items based on a global popularity of each candidate content item;

generating, with the one or more processors, a ranking for each candidate content item based on the global scores;

generating, with the one or more processors, a model for the user comprising at least one interest of the user and at least one prior action of the user associated with the heterogeneous data sources;

generating, with the one or more processors, a set of the candidate content items that are associated with the at least one interest of the user based on the ranking;

computing, with the one or more processors, an interestingness score for each candidate content item in the set by summing properties of each candidate content item over single-attribute properties using the model and based upon interestingness of each candidate content item to the user and an extent to which the candidate content item's popularity has increased within a geographic area associated with the user;

generating, with the one or more processors, the stream of content for the user from selected content items, wherein the interestingness score for each selected content item exceeds a threshold score and wherein at least one of the selected content items is displayed with an explanation identifying an interest from the model that is associated with the selected content item;

receiving a rejection from the user of the interest identified from the model that is associated with the at least one selected content item;

updating the model by removing the interest from the model; and modifying, with the one or more processors, the stream of content based on updating the model.

2. The method of claim 1, wherein the at least one prior action of the user includes a search term used in a search engine and wherein the at least one interest of the user includes a subject corresponding to the search term.

3. The method of claim 1, further comprising a step of sharing the at least one selected content item with a friend of the user.

4. The method of claim 1, further comprising a step of receiving the candidate content items from a friend of the user, the received candidate content items being generated from a content stream of the friend.

5. The method of claim 2, further comprising receiving an update to the model based upon an interaction of the user with a website.

6. The method of claim 5, wherein the interaction of the user with the website includes providing at least one of a user preference, a user interest, a comment, a tag and a search.

7. The method of claim 1, wherein the interestingness includes social relevance to the user and an interest match of the candidate content item to the user.

8. The method of claim 1, wherein the threshold score for the candidate content item is determined based at least in part on quality and quantity of similar candidate content items.

9. The method of claim 1, wherein generating the model uses a log of activities on a social network.

10. The method of claim 1, wherein the heterogeneous data sources comprise at least one of a search history, a blog post, a news article, a news feed, a video, a map, a message, an email message, an instant message, a microblog, a text-based post, a phone call and an activity on site.

11. The method of claim 1, further comprising a step of generating the explanation for the at least one selected content item in the stream of content.

12. The method of claim 1, further comprising a step of receiving a request for the stream of content.

13. The method of claim 12, further comprising steps of:

determining, based on the request, context information including at least one of a geographic location of the user, time of day and contextual cues surrounding the request; and using the context information in generating the stream of content.

14. The method of claim 1, further comprising steps of:

receiving from the user an indication that one of the selected content items in the stream of content is interesting; and generating additional content items that are related to the one of the selected content items in the stream of content.

15. The method of claim 14, wherein the additional content items are compared to the model.

16. The method of claim 1, further comprising a step of applying collaborative filtering to the stream of content.

17. The method of claim 16, wherein the step of applying collaborative filtering includes selecting the candidate content items based on shared similarities between the user and the other users.

18. The method of claim 1, wherein each selected content item in the stream of content is displayed with at least one tag that indicates a subject matter of each selected content item.

19. The method of claim 1, wherein the interest is defined by the user.

20. The method of claim 1, further comprising a step of inferring the interest from activities of at least one of the user and the user's friend.

21. The method of claim 1, wherein the selected content items are presented to the user as a decision tree, the selected content items being organized in the decision tree from broad to narrow topics.

22. A system for generating a stream of content for a user comprising:

a logging unit for receiving at least one interest from the user and at least one prior action of the user associated with heterogeneous data sources, generating a log and transmitting the log to a data storage;

a model generation engine coupled to the data storage, the model generation engine for generating a model for the user based on the log, receiving a rejection from the user of an interest identified from the model that is associated with at least one of selected content items being displayed with an explanation and updating the model by removing the interest from the model; and a scoring engine coupled to the model generation engine, the scoring engine for receiving candidate content items from the heterogeneous data sources including from other users in at least one social network that have a relationship with the user, receiving a weight applied to each of the candidate content items from the other users in the at least one social network that have the relationship with the user, the weight being modified based on a degree of separation between the user and each of the other users, computing a user-independent global score for each of the candidate content items based on a global popularity of each candidate content item, generating a ranking for each candidate content item based on the global scores, generating a set of the candidate content items that are associated with the at least one interest of the user based on the ranking, computing an interestingness score for each candidate content item in the set by summing properties of each candidate content item over single-attribute properties using the model and based upon interestingness of each candidate content item to the user and an extent to which the candidate content item's popularity has increased within a geographic area associated with the user, generating the stream of content for the user from the selected content items, wherein the interestingness score for each selected content item exceeds a threshold score and wherein the at least one selected content items is displayed with the explanation identifying the interest from the model that is associated with the selected content item, and modifying the stream of content based on updating the model.

23. The system of claim 22 wherein the at least one prior action of the user includes a search term used in a search engine and wherein the at least one interest of the user includes a subject corresponding to the search term.

24. The system of claim 22, wherein the scoring engine receives a request from the user to transmit the at least one selected content item to a friend of the user and wherein the scoring engine transmits the at least one selected content item to the friend's social network.

25. The system of claim 22, wherein the scoring engine receives the candidate content items from a friend of the user, the received candidate content items being generated from a content stream of the friend.

26. The system of claim 22, wherein the model generation engine updates the model to include a user's interaction with a website.

27. The system of claim 26, wherein the interaction of the user with the website includes providing at least one of a user preference, a user interest, a comment, a tag and a search.

28. The system of claim 22, wherein the logging unit, the model generation engine and the scoring engine are stored on a user device.

29. The system of claim 22, wherein the logging unit, the model generation engine and the scoring engine are stored on a third-party server.

30. The system of claim 22, wherein the interestingness includes social relevance to the user and an interest match of the candidate content item to the user.

31. The system of claim 22, wherein the threshold score for the candidate content item is determined based at least in part on quality and quantity of similar candidate content items.

32. The system of claim 22, wherein the log includes activities on a social network.

33. The system of claim 22, wherein the heterogeneous data sources comprise at least one of a search history, a blog post, a news article, a news feed, a video, a map, a message, an email message, an instant message, a microblog, a text-based post, a phone call and an activity on site.

34. The system of claim 22, wherein the scoring engine generates the explanation for the at least one selected content item in the stream of content.

35. The system of claim 22, wherein the scoring engine receives a request for the content stream.

36. The system of claim 35, wherein the scoring engine determines, based on the request, context information including at least one of a geographic location of the user, time of day and contextual cues surrounding the request and the scoring engine uses the context information in generating the stream of content.

37. The system of claim 22, wherein the logging unit receives an indication that one of the selected content items in the stream of content is interesting and the scoring engine generates additional content items that are related to the interesting item.

38. The system of claim 37, wherein the scoring engine compares the additional content items to the model.

39. The system of claim 22, further comprising a collaborative filtering engine for generating additional candidate content items.

40. The system of claim 39, wherein the collaborative filtering engine selects the additional candidate content items based on shared similarities between the user and the other users.

41. The system of claim 22, wherein the scoring engine displays the stream of content with at least one tag that indicates a subject matter of the selected content item.

42. The system of claim 22, wherein the interest is defined by the user.

43. The system of claim 22, wherein the model generation engine infers the interest from activities of at least one of the user and the user's friend.

44. A computer program product comprising a non-transitory computer useable medium including a computer readable program, wherein the computer readable program when executed on a computer causes the computer to:
receive candidate content items from heterogeneous data sources including from other users in at least one social network that have a relationship with a user;
apply a weight to each of the candidate content items from the other users in the at least one social network that have the relationship with the user, the weight being modified based on a degree of separation between the user and each of the other users;
compute a user-independent global score for each of the candidate content items based on a global popularity of each candidate content item;
generate a ranking for each candidate content item based on the global scores;
generate a model for the user comprising at least one interest of the user and at least one prior action of the user associated with the heterogeneous data sources;
generate a set of the candidate content items that are associated with the at least one interest of the user based on the ranking;
compute an interestingness score for each candidate content item in the set by summing properties of each candidate content item over single-attribute properties using the model and based upon interestingness of each candidate content item to the user and an extent to which the candidate content item's popularity has increased within a geographic area associated with the user;
generate the stream of content for the user from selected content items, wherein the interestingness score for each selected content item exceeds a threshold score and wherein at least one of the selected content items is displayed with an explanation identifying an interest from the model that is associated with the selected content item;
receive a rejection from the user of the interest identified from the model that is associated with the at least one selected content item;
update the model by removing the interest from the model; and
modify the stream of content based on updating the model.

* * * * *